United States Patent
Otsuki et al.

(10) Patent No.: US 8,260,453 B2
(45) Date of Patent: Sep. 4, 2012

(54) NUMERICAL CONTROLLER FOR CONTROLLING FIVE-AXIS MACHINING APPARATUS

(75) Inventors: Toshiaki Otsuki, Minamitsuru-gun (JP); Soichiro Ide, Minamitsuru-gun (JP); Osamu Hanaoka, Minamitsuru-gun (JP); Daijirou Koga, Minamitsuru-gun (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 526 days.

(21) Appl. No.: 12/325,419

(22) Filed: Dec. 1, 2008

(65) Prior Publication Data
US 2009/0157218 A1 Jun. 18, 2009

(30) Foreign Application Priority Data
Dec. 13, 2007 (JP) .................. 2007-322546

(51) Int. Cl.
G05B 19/00 (2006.01)
G05B 19/18 (2006.01)
G05B 19/25 (2006.01)
G05B 19/41 (2006.01)
G05B 19/416 (2006.01)
B25J 9/06 (2006.01)
B25J 9/10 (2006.01)

(52) U.S. Cl. ........ 700/189; 700/186; 700/188; 700/252; 318/568.15; 318/568.18; 318/569; 318/573; 901/19; 901/20

(58) Field of Classification Search .................. 700/117, 700/188, 189, 248, 249, 251, 252, 186; 318/568.15, 318/568.18, 568.23, 573, 567, 569; 409/80; 901/20, 19
See application file for complete search history.

(56) References Cited

U.S. PATENT DOCUMENTS 3,418,858 A * 12/1968 Minnich ......................... 74/68
4,572,028 A * 2/1986 Witte ............................ 74/828
(Continued)

FOREIGN PATENT DOCUMENTS
EP 1 235 126 8/2002
(Continued)

OTHER PUBLICATIONS

Japanese Notice of Reasons for Rejection mailed Mar. 10, 2009 issued in Japanese Application No. 2007-322546 (including a partial translation thereof).

(Continued)

*Primary Examiner* — Mohammad Ali
*Assistant Examiner* — Jennifer L Norton
(74) *Attorney, Agent, or Firm* — Drinker Biddle & Reath LLP

(57) ABSTRACT

A numerical controller for controlling a five-axis machining apparatus, in which a tool orientation command is corrected to thereby attain a smooth machined surface and a shortened machining time. The numerical controller includes command reading device that successively reads a tool orientation command, tool orientation command correcting device that corrects the tool orientation command so that a ratio between each rotary axis motion amount and a linear axis motion amount is constant in each block, interpolation device that determines respective axis positions at every interpolation period based on the tool orientation command corrected by the tool orientation command correcting device, a motion path command, and a relative motion velocity command such that a tool end point moves along a commanded motion path at a commanded relative motion velocity, and device that drives respective axis motors such that respective axis positions determined by the interpolation device are reached.

6 Claims, 7 Drawing Sheets

U.S. PATENT DOCUMENTS

| | | | |
|---|---|---|---|
| 4,811,235 A * | 3/1989 | Shirakata | 700/188 |
| 4,868,472 A * | 9/1989 | Daggett | 318/568.2 |
| 5,005,135 A * | 4/1991 | Morser et al. | 700/193 |
| 5,471,395 A * | 11/1995 | Brien | 700/186 |
| 6,922,607 B2 * | 7/2005 | Yamazaki et al. | 700/188 |
| 7,274,165 B2 * | 9/2007 | Takeuchi et al. | 318/567 |
| 7,348,748 B2 * | 3/2008 | Wilson | 318/573 |
| 7,847,502 B2 * | 12/2010 | Iwashita et al. | 318/567 |
| 7,848,851 B2 * | 12/2010 | Nishi et al. | 700/264 |
| 7,850,406 B2 * | 12/2010 | Kawai et al. | 409/84 |
| 7,853,351 B2 * | 12/2010 | Corey | 700/193 |
| 7,856,282 B2 * | 12/2010 | Tabor | 700/63 |
| 7,869,897 B2 * | 1/2011 | Otsuki et al. | 700/189 |
| 7,925,462 B2 * | 4/2011 | Tiemann | 702/94 |
| 7,962,240 B2 * | 6/2011 | Morrison et al. | 700/186 |
| 7,969,111 B2 * | 6/2011 | Otsuki et al. | 318/572 |
| 8,041,447 B2 * | 10/2011 | Otsuki et al. | 700/174 |
| 2002/0068990 A1 * | 6/2002 | Yamazaki et al. | 700/187 |
| 2003/0033050 A1 * | 2/2003 | Yutkowitz | 700/189 |
| 2003/0120376 A1 * | 6/2003 | Shibata et al. | 700/189 |
| 2004/0181307 A1 * | 9/2004 | Hirai et al. | 700/194 |
| 2007/0172320 A1 | 7/2007 | Glaesser | |
| 2008/0234857 A1 * | 9/2008 | Endo et al. | 700/186 |
| 2010/0286813 A1 * | 11/2010 | Yamada | 700/174 |
| 2012/0001583 A1 * | 1/2012 | Otsuki et al. | 318/632 |
| 2012/0065768 A1 * | 3/2012 | Sakata | 700/187 |

FOREIGN PATENT DOCUMENTS

| | | |
|---|---|---|
| JP | 7-334228 | 12/1995 |
| JP | 2003-195917 | 7/2003 |
| JP | 2005-174010 | 6/2005 |
| JP | 2005-182437 | 7/2005 |
| JP | 2005-352876 | 12/2005 |

OTHER PUBLICATIONS

Bohez, E.L.J., "Compensating for Systematic Errors in 5-Axis NC Machining," Computer Aided Design, Elsevier Publishers BV., GB LNKD, vol. 34, No. 5, Apr. 15, 2002, pp. 391-403.

Lim, E.M., et al., "Error Compensation for Sculpted Surface Productions by the Application of Control-Surface Strategy Using Predicted Machining Errors," Transactions of the American Society of Mechanical Engineers, Series B: Journal of Engineering for Industry, ASME vol. 119, No. 3, Aug. 1, 1997, pp. 402-409.

European Search Report dated Sep. 30, 2010.

* cited by examiner

NUMERICAL CONTROLLER FOR CONTROLLING FIVE-AXIS MACHINING APPARATUS

RELATED APPLICATIONS DATA

This application claims priority under 35 U.S.C. §119 and/or §365 to Japanese Application No. 2007-322546 filed Dec. 13, 2007, the entire contents of which are incorporated herein by reference.

BACKGROUND OF THE INVENTION

1. Field of the Invention

The present invention relates to a numerical controller for controlling a five-axis machining apparatus having three linear axes and two rotary axes for machining a workpiece mounted on a table.

2. Description of Related Art

To machine a workpiece by a five-axis machining apparatus, the following machining technique has generally been utilized. That is, upon reception of a motion command indicating a motion path for a tool end point and a tool orientation, an interpolation is performed on the motion path for the tool end point based on a commanded relative motion velocity between workpiece and tool, and the tool orientation is also interpolated. As a result, the tool end point moves along the commanded motion path at a commanded velocity, with the tool orientation changing (see, JP2003-195917A, JP2005-174010A, and JP2005-182437A). The above described command and machining technique are called tool end point control, and program commands are prepared by using a CAM.

JP 2003-195917A discloses a technique in which a motion path for a tool end point and a tool orientation in a motion command are interpolated based on a relative motion velocity between workpiece and tool, and interpolation points of the motion path are corrected, thereby driving servomotors to move the tool end point along the commanded motion path at a commanded velocity.

JP2005-174010A discloses a technique for preparing an NURBS curve based on commands for two rotary axes.

JP2005-182437A discloses a technique in which based on a point sequence that represents a commanded motion path of a tool end point and a vector sequence that represents a commanded tool orientation, an interpolation is performed to change a machining point along a curve generated according to the commanded point sequence and change a vector end point indicating the tool orientation along a curve generated according to the commanded vector sequence.

As described above, program commands for use by a numerical controller for tool end point control of a five-axis machining apparatus are prepared by a CAM.

The following is a description of an ordinary method for generating program commands by use of a CAM. A curved surface to be machined shown in FIG. 1 is divided into sections called triangular patches as shown in FIG. 2. A tool locus is calculated on the triangular patches as shown in FIG. 3, thereby preparing program commands with blocks each of which is defined by intersections of the tool locus and sides of triangular patches concerned, as shown in FIG. 4.

The triangular patches are prepared to have an allowable tolerance with respect to the curved surface to be machined. Since the path of the tool end point is on triangular patches as shown in FIG. 4, the path of the tool end point is smooth within the allowed tolerance, if the curved surface to be machined is smooth. The tool orientation is prepared to extend in a direction perpendicular to the prepared triangular patches. At each of boundaries between triangular patches concerned, the tool orientation is generally determined using an average between the vertical directions of two corresponding triangular patches.

The tool orientation can therefore largely change at a block in which the path of the tool end point is short in length, as shown in FIG. 5 which is a cross section taken along the tool path. Specifically, in some cases, the tool orientation does not change in proportion to the length indicated by a linear axis command, i.e., the length of a motion path of the tool end point, but largely changes as shown in FIG. 5.

If such program commands are executed, deceleration and acceleration are repeated due to a change in velocity of a rotary axis, posing a problem that the machined shape becomes rough and the machining time becomes long. Such a problem occurs depending on the machined shape and the type of CAM used.

SUMMARY OF THE INVENTION

The present invention provides a numerical controller for controlling a five-axis machining apparatus, in which a tool orientation command is corrected to thereby attain a smooth machined shape and a shortened machining time.

A numerical controller of the present invention controls a five-axis machining apparatus provided with three linear axes and two rotary axes for moving a tool relative to a workpiece mounted on a table, according to a machining program. The numerical controller comprises: command reading means that successively reads a motion path command for the linear axes, a relative velocity command for designating a velocity of the tool relative to the workpiece, and a tool orientation command designating an orientation of the tool relative to the table, from the machining program; tool orientation command correcting means that successively corrects the tool orientation command to obtain corrected tool orientation command; interpolation means that determines respective axes positions at every interpolation period based on the corrected tool orientation command, the motion path command and the relative velocity command such that an end point of the tool moves along the commanded motion path relative to the workpiece at the commanded relative velocity; and means that drives motors for the respective axes to reach the respective axes positions determined by the interpolation means.

The tool orientation command correcting means may correct the tool orientation command such that an amount of change of the tool orientation is proportional to an amount of change of motion of the linear axes, for the motion path command.

The tool orientation commands may be prepared in terms of positions of the two rotary axes in the machining program, and the tool orientation command correcting means may correct the positions of the two rotary axes.

The tool orientation commands may be prepared in terms of tool orientation vectors, and the tool orientation command correcting means may correct the tool orientation vectors.

The tool orientation command correcting means may transform the tool orientation vectors into positions of the two rotary axes, correct the positions of the two rotary axes obtained by the transformation, and inversely transform the corrected positions of the two rotary axes into corrected tool orientation vectors.

When a command to start the tool orientation command correction is read from the machining program, a predetermined number of blocks to be corrected may be read in advance by the command reading means until a command to terminate the tool orientation command correction is read, and the tool orientation command correcting means may correct the tool orientation command in the read blocks.

The start of the tool orientation command correction is commanded by a G code, and the termination of the tool orientation command correction is commanded by another G code other than the G code.

According to the present invention, the machining time can be shortened while attaining a smooth machined shape in machining a workpiece by a five-axis machining apparatus.

DETAILED DESCRIPTION

The present invention contemplates to shorten the machining time while obtaining a smooth machined shape of a workpiece by correcting a tool orientation command per se, which is commanded at a block end point. The motion of a tool end point with which a workpiece is machined is generally significant in machining the workpiece by a five-axis machining apparatus. On the other hand, a tool orientation does not greatly affect a machining process, even if it includes some error. In a five-axis machining apparatus, a problem of an unsmooth machined shape and a long machining time must be solved. The present invention therefore corrects the tool orientation command to make the machined workpiece shape smooth and shorten the machining time, while allowing the tool orientation error. In the following, a description will be given of first and second embodiments of the present invention in which the tool orientation command is corrected.

With reference to a first example of program commands shown in Table 1, the first embodiment of the present invention will be described. These program commands are prepared by a CAM described in the description of related art. The technique for generating the program commands per se belongs to the known art.

In a tool orientation command correcting mode, a maximum number of look-ahead blocks are read in advance as program commands to be corrected until the tool orientation command correcting mode is terminated. A tool orientation command in each block in the look-ahead program commands to be corrected is corrected such that a ratio between a rotary axis motion amount and a linear axis motion amount becomes constant. It should be noted that the maximum number of look-ahead blocks is separately set as a parameter.

In this example, Gaa is a G code for commanding the tool orientation command correcting mode, and Gbb is a G code for commanding the release of the tool orientation command correcting mode. Prior to Gaa being commanded, a relative motion velocity f between workpiece and tool in a motion path of the tool end point is commanded in terms of a modal command Ff, the motion path being commanded by X, Y, and Z.

Figure 1:
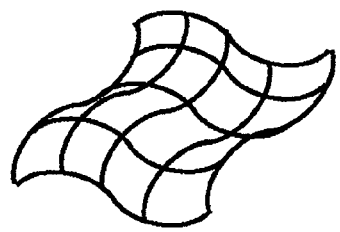
FIG. 1 is a view showing a curved surface to be machined.
Figure 2:
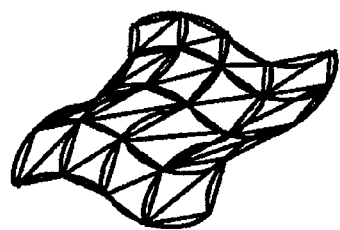
FIG. 2 is a view showing that the curved surface to be machined is divided into sections called triangular patches.
Figure 3:
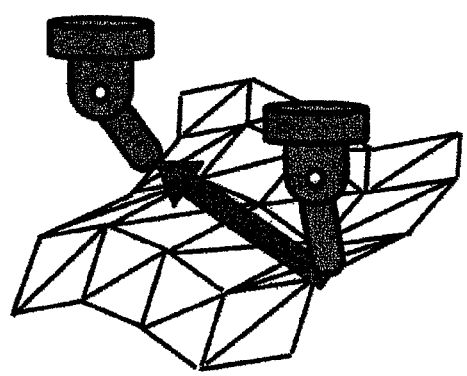
FIG. 3 is a view showing that a tool locus is calculated on the triangular patches.
Figure 4:
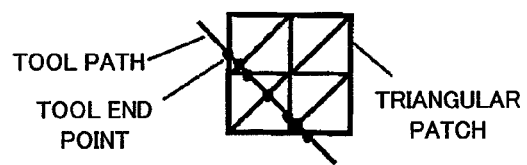
FIG. 4 is a view showing a relation between triangular patches, a tool path, and a tool end point position.
Figure 5:
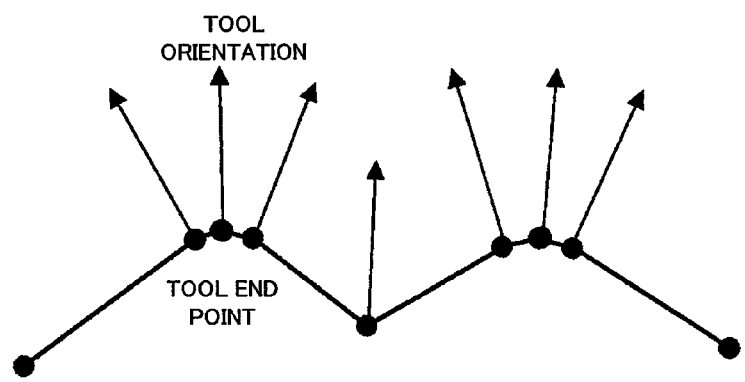
FIG. 5 is a view showing triangular patches in cross section along the tool path.
Figure 6:
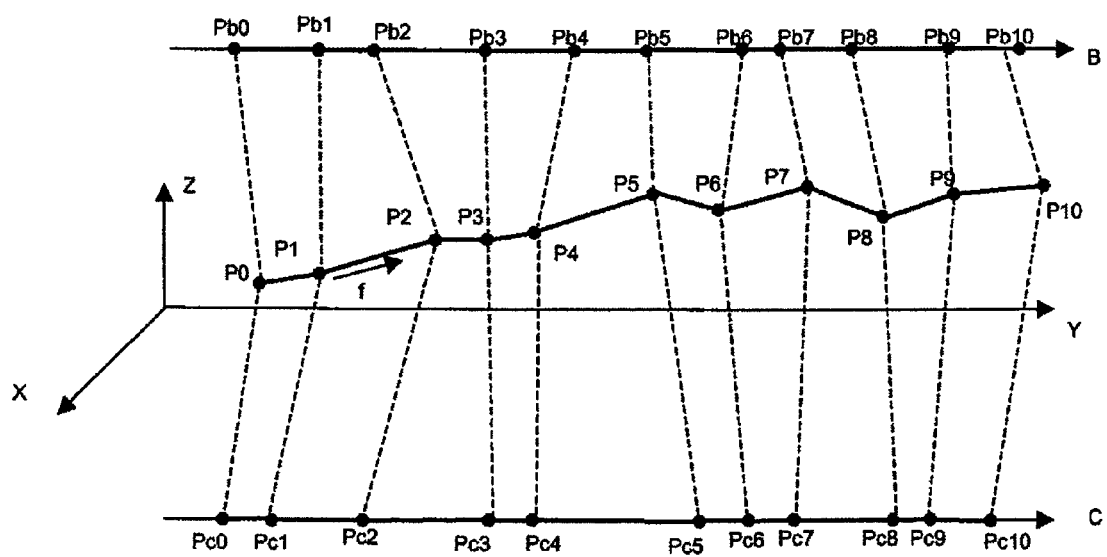
FIG. 6 is a view showing, for comparison, position commands P1 to P10 for X-, Y-, and Z-axes represented in an X, Y, and Z coordinate system, and position commands Pb1 to Pb10 for a B-axis and position commands Pc1 to Pc10 for a C-axis represented in a one-dimensional coordinate system.

Position commands for the X, Y, and Z axes, position commands for the B-axis, and position commands for the C-axis are such as shown in FIG. 6. In FIG. 6, for comparison, position commands P1(Px1, Py1, Pz1) to P10(Px10, Py10, Pz10) for the X, Y, and Z axes are represented in an X, Y, Z coordinate system, and position commands Pb1 to Pb10 for the B-axis and position commands Pc1 to Pc10 for the C-axis are represented in a one-dimensional coordinate system. Positions P0(Px0, Py0, Pz0), Pb0, and Pc0 represent respective axis positions at the time of the Gaa being commanded.

While the X, Y, and Z axes move between the positions P0(Px0, Py0, Pz0) and P10(Px10, Py10, Pz10) at a velocity f, the B axis moves between the positions Pb0 and Pb10 and the C axis moves between the positions Pc0 and Pc10. In each block, the X, Y, and Z axes move in synchronism with motions of the B and C axes such that when the X, Y, and Z axes move between P0(Px0, Py0, Pz0) and P1(Px1, Py1, Pz1) at the velocity f, the B axis moves between Pb0 and Pb1 and the C axis moves between Pc0 and Pc10, and when the X, Y, and Z axes move between P1(Px1, Py1, Pz1) and P2(Px2, Py2, Pz2) at the velocity f, the B axis moves between Pb1 and Pb2 and the C axis between Pc1 and Pc2.

Table 1 shows an example that includes commands for ten blocks between Gaa and Gbb, however, the number of blocks is not limited to ten. Position commands for respective axes are absolute commands. Two rotary axes are represented by B and C axes, but may be other axes such as A and B axes or A and C axes.

TABLE 1

| G | aa ; | | | | | | | | |
|---|---|---|---|---|---|---|---|---|---|
| X | Px1 | Y | Py1 | Z | Pz1 | B | Pb1 | C | Pc1 ; |
| X | Px2 | Y | Py2 | Z | Pz2 | B | Pb2 | C | Pc2 ; |
| X | Px3 | Y | Py3 | Z | Pz3 | B | Pb3 | C | Pc3 ; |
| X | Px4 | Y | Py4 | Z | Pz4 | B | Pb4 | C | Pc4 ; |
| X | Px5 | Y | Py5 | Z | Pz5 | B | Pb5 | C | Pc5 ; |
| X | Px6 | Y | Py6 | Z | Pz6 | B | Pb6 | C | Pc6 ; |

TABLE 1-continued

| | | | | | | | | | |
|---|---|---|---|---|---|---|---|---|---|
| X | Px7 | Y | Py7 | Z | Pz7 | B | Pb7 | C | Pc7; |
| X | Px8 | Y | Py8 | Z | Pz8 | B | Pb8 | C | Pc8; |
| X | Px9 | Y | Py9 | Z | Pz9 | B | Pb9 | C | Pc9; |
| X | Px10 | Y | Py10 | Z | Pz10 | B | Pb10 | C | Pc10; |
| G | bb; | | | | | | | | |

The ratio between each rotary axis motion amount and the linear axis motion amount is not constant between blocks. Specifically, the ratio between each rotary axis motion amount and the linear axis motion amount is not constant between the zeroth to the n-th blocks (n=9), the ratio being calculated in accordance with equation (1) or (2).

Figure 7:
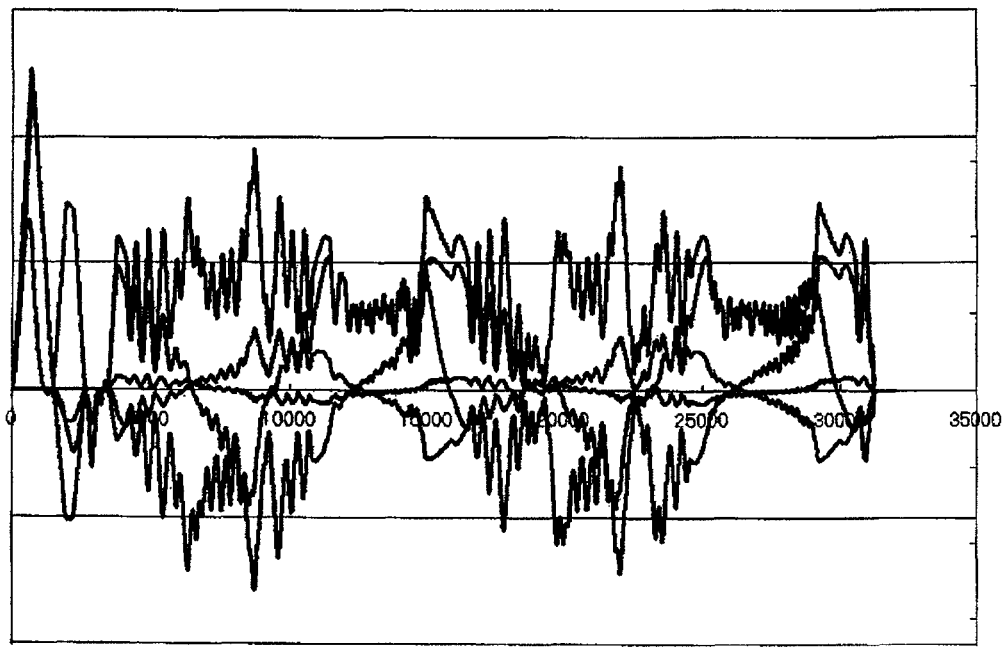
FIG. 7 is a view showing an example of waveforms of respective axis velocities in a case that a ratio between each rotary axis motion amount and a linear axis motion amount is not constant between blocks.

FIG. 7 shows exemplar waveforms of respective axis velocities. In FIG. 7, time is taken along the abscissa and respective axis velocities are taken along the ordinate. In FIG. 7, a value of 35000 is measured in millisecond, and velocities of five axes are shown in superposition. The respective axis velocities are represented in different units (for example, mm/min, degree/min). As indicated in FIG. 7, the respective axis velocities oscillate. Oscillation waves correspond to respective ones of block commands. It should be noted that FIG. 7 shows the exemplar waveforms of respective axis velocities for a case where the command blocks are not 10 but about 500 in number.

$$\frac{|Pb_{n+1} - Pb_n|}{|P_{n+1} - P_n|} \quad (n = 0, 1, 2, \ldots, 9) \tag{1}$$

$$\frac{|Pc_{n+1} - Pc_n|}{|P_{n+1} - P_n|} \quad (n = 0, 1, 2, \ldots, 9) \tag{2}$$

The positions Pb1 to Pb10 and Pc1 to Pc10 are corrected in the following manner such that the ratio between each rotary axis motion amount and the linear axis motion amount calculated in accordance with equation (1) or (2) becomes constant between the respective blocks. When reading the code Gaa, the numerical controller starts a look-ahead and correction process. The number of look-ahead blocks is five at the maximum.

A description will be given of the following equations. Equations (3), (4) are transient equations used between the start of the process and the execution of equation (5), and equations (6), (7) are transient equations used between the execution of equation (5) and the end of the process. Equation (5) is therefore important.

Equation (5) will be described in detail below. The second term or fraction term on the right side of equation (5) includes a denominator in accordance with which linear axis motion amounts in the look-ahead blocks (from the (n−2)-th block to the (n+2)-th block) are calculated. In accordance with a numerator of the fraction term of equation (5), the linear axis motion amount in a block to be corrected (the n-th block) is calculated. The fraction term therefore represents the ratio between the linear axis motion amounts in the look-ahead blocks and the linear axis motion amount in the block to be corrected.

This ratio is multiplied by a rotary axis (B- or C-axis) motion amount ($Pa_{n+2} - Pa_{n-2}$) in the look-ahead blocks (from the (n−2)-th block to the (n+2)-th block), whereby correction is performed such that the ratio between the rotary axis motion amount and the linear axis motion amount in the block to be corrected becomes constant between the look-ahead blocks.

Then the corrected rotary axis motion amount is added to the rotary axis position command of the block (the (n−1)-th block) immediately preceding the block to be corrected, i.e., the already corrected rotary axis position command ($Pa_{n-1}'$), thereby obtaining the rotary axis position command in the block to be corrected, which is a rotary axis position command corrected based on the corrected rotary axis motion amount.

(A) The first block is read. As indicated in equation (3), the first block is not corrected.

$$Pa_1' = Pa_1 \tag{3}$$

(B) The second and third blocks are read, and B- and C-axis position commands in the second block are corrected as indicated by equation (4).

$$Pa_2' = Pa_1' + \frac{|P_2 - P_1|}{\sum_{i=1}^{3} |P_i - P_{i-1}|} * (Pa_3 - Pa_0) \tag{4}$$

$(a = b, c)$ (C) The (n+1)-th and (n+2)-th blocks are read, B- and C-axis position commands in the n-th block are corrected (n=3 to 8), as indicated by equation (5). The (n+1)-th blocks are already read for n=4 to 8.

$$Pa_n' = Pa_{n-1}' + \frac{|P_n - P_{n-1}|}{\sum_{i=n-2}^{n+2} |P_i - P_{i-1}|} * (Pa_{n+2} - Pa_{n-3}') \tag{5}$$

$(a = b, c)$ (D) When the code Gbb is read, reading of a new block is stopped. As indicated by equation (6), the B- and C-axis position commands in the ninth block are corrected.

$$Pa_9' = Pa_8' + \frac{|P_9 - P_8|}{\sum_{i=8}^{10} |P_i - P_{i-1}|} * (Pa_{10} - Pa_7') \tag{6}$$

$(a = b, c)$ (E) The tenth block is not corrected.

$$Pa_{10}' = Pa_{10} \tag{7}$$

(a=b,c)

Figure 8:
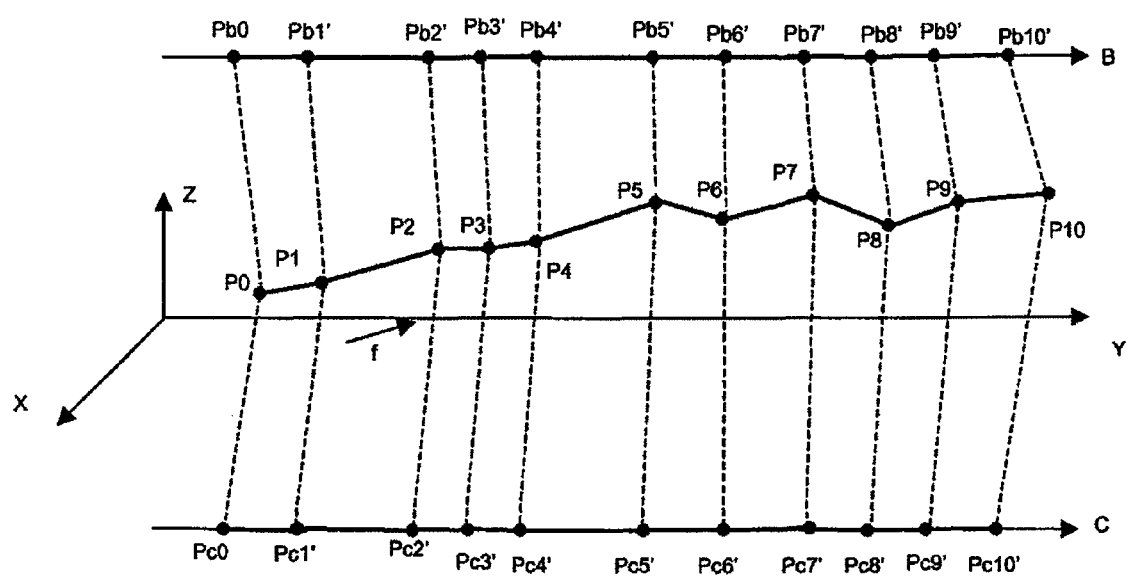
FIG. 8 is a view showing position commands for the B- and C-axes after execution of correction on the rotary axis position commands shown in FIG. 6.

As described in (A) to (E), the rotary axis position commands are corrected while blocks are sequentially read in advance. The B- and C-axis position commands in FIG. 6 are subjected to the rotary axis position command correction based on equations (3) to (7) and thereby corrected to ones shown in FIG. 8. It should be noted that it is not inevitably necessary to correct the B- and C-axis motion amounts in each block after completion of reading all of the blocks, but the motion amounts in each block may be corrected to be nearly proportional to the corresponding linear axis motion amount.

Figure 9:
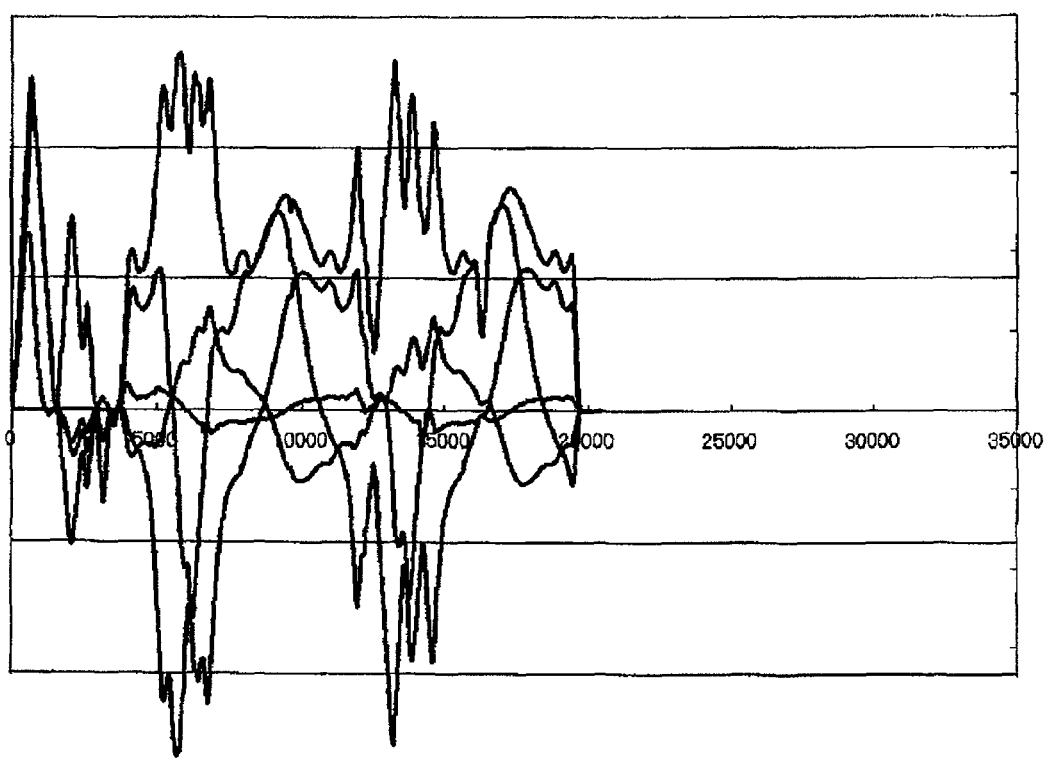
FIG. 9 is a view showing an example of waveforms of respective axis velocities observed after execution of the rotary axis position command correction.

As a result of the rotary axis position command correction described in (A) to (E), the respective axis velocity waveforms in FIG. 7 for a case where the ratio between each rotary axis motion amount and linear axis motion amount is not constant between respective blocks are corrected to ones shown in FIG. 9. As shown in FIG. 9, the rotary axis position command correction suppresses the oscillation of respective axis velocities in each block. Since the velocity oscillation is suppressed, the machined shape of the workpiece is smoothened. Since deceleration occurs less likely, the machining time is shortened. In the example in FIG. 9, the machining time is shortened to about 70% of the case where the rotary axis position commands are not corrected. Power consumption for the machining can also be reduced.

Figure 13:
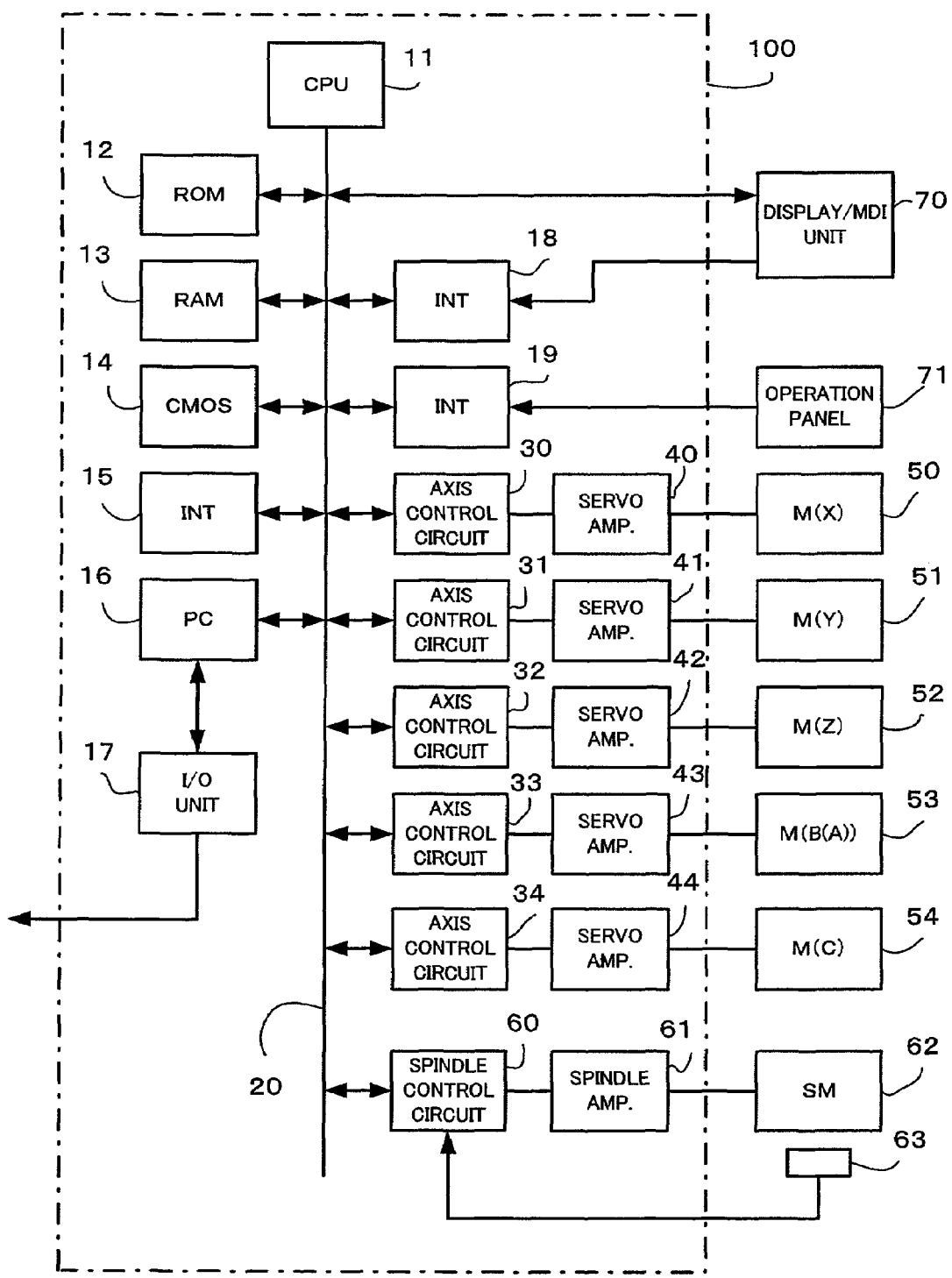
FIG. 13 is a block diagram showing the essential part of a numerical controller for embodying embodiments of the present invention.

It should be noted that as in the case of a numerical controller shown in FIG. 13, known art can be applied to interpolation means that determines respective axis positions at every interpolation period based on a tool orientation command corrected by tool orientation command correcting means, a motion path command, and a relative motion velocity command such that the tool end point moves along a commanded motion path at a commanded velocity, and can be applied to means that drives respective axis motors to the respective axis positions determined by the interpolation means. The numerical controller in FIG. 13 will be described later.

A second embodiment of the present invention will be described with reference to a second example of program commands shown in Table 2. The look-ahead method and the like are similar to those in the first embodiment.

TABLE 2

| G | aa ; | | | | | | | | | | |
|---|---|---|---|---|---|---|---|---|---|---|---|
| X | Px1 | Y | Py1 | Z | Pz1 | I | Pi1 | J | Pj1 | K | Pk1 ; |
| X | Px2 | Y | Py2 | Z | Pz2 | I | Pb2 | J | Pj2 | K | Pk2 ; |
| X | Px3 | Y | Py3 | Z | Pz3 | I | Pb3 | J | Pc3 | K | Pk3 ; |
| X | Px4 | Y | Py4 | Z | Pz4 | I | Pb4 | J | Pj4 | K | Pk4 ; |
| X | Px5 | Y | Py5 | Z | Pz5 | I | Pb5 | J | Pj5 | K | Pk5 ; |
| X | Px6 | Y | Py6 | Z | Pz6 | I | Pb6 | J | Pj6 | K | Pk6 ; |
| X | Px7 | Y | Py7 | Z | Pz7 | I | Pb7 | J | Pj7 | K | Pk7 ; |
| X | Px8 | Y | Py8 | Z | Pz8 | I | Pb8 | J | Pj8 | K | Pk8 ; |
| X | Px9 | Y | Py9 | Z | Pz9 | I | Pb9 | J | Pj9 | K | Pk9 ; |
| X | Px10 | Y | Py10 | Z | Pz10 | I | Pb10 | J | Pj10 | K | Pk10 ; |
| G | bb ; | | | | | | | | | | |

In the second embodiment, the tool orientation is commanded in terms of a tool orientation vector based on normalized commands I, J, K. A technique for commanding the tool orientation in the form of a tool orientation vector is known, for example, from Japanese Laid-open Patent Publication No. 2003-195917 described in the description of the prior art. The tool orientation vector is calculated from position information on an axis that controls the inclination of tool. In a case for example that the tool inclination is controlled by B- and C-axes, the tool orientation vector is calculated form current positions of the B- and C-axes.

Figure 10:
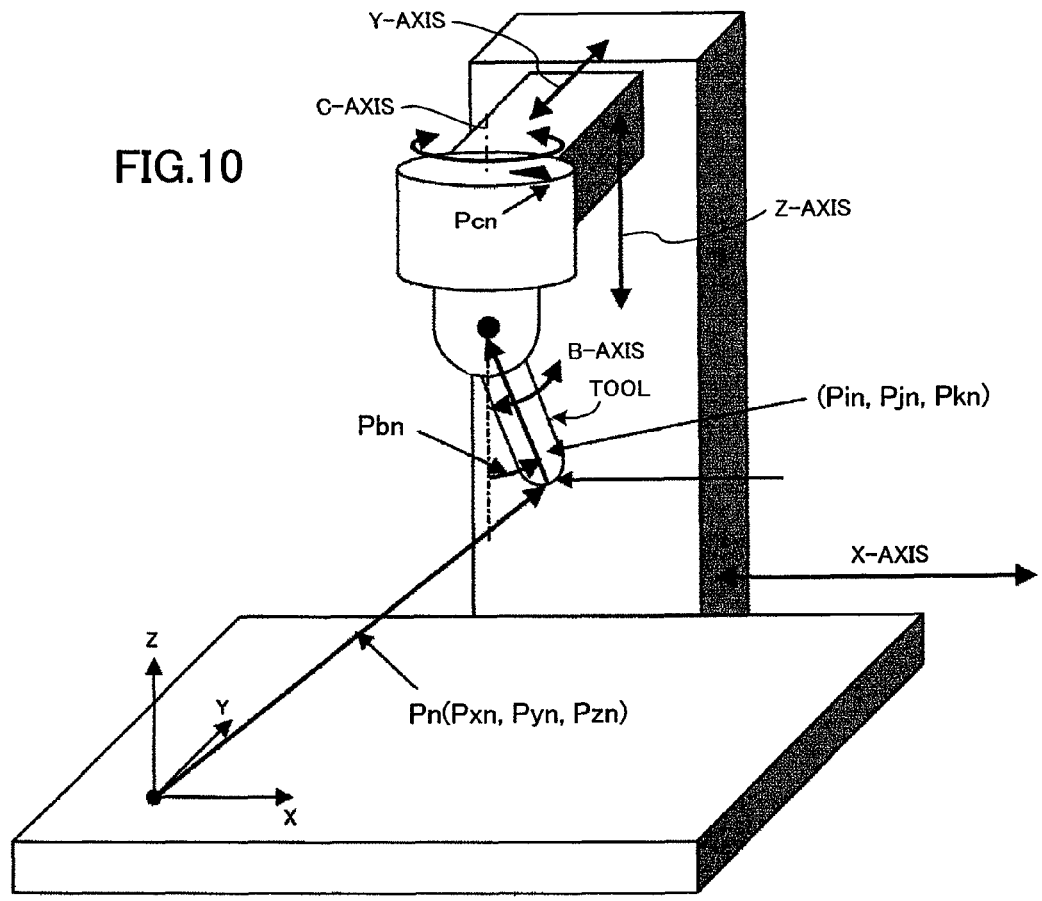
FIG. 10 is a view for explaining a tool head rotary type five-axis machining apparatus.

Assuming that the five-axis machining apparatus is constructed to be a rotary head type shown in FIG. 10, B- and C-axis positions can be calculated from I, J, K commands in accordance with equations (8) and (9) where Pcn varies from 0 degree to 360 degrees and Pbn varies from 0 degree to 90 degrees. It should be noted that n=1 to 10.

$$Pc_n = \arctan\frac{Pj_n}{Pi_n} \\ Pb_n = \arctan\frac{\sqrt{(Pi_n^2 + Pj_n^2)}}{Pk_n}$$ (8)

$(n = 1\text{-}10)$ $$\tan(Pc_n') = \frac{Pj_n''}{Pi_n''} \\ \tan(Pb_n') = \frac{\sqrt{(Pi_n'')^2 + (Pj_n'')^2}}{Pk_n'} \\ (Pi_n'')^2 + (Pj_n'')^2 + (Pk_n')^2 = 1$$ (9)

$(n = 0\text{-}9)$

With the above calculations, the tool orientation vector command (Pin, Pjn, Pkn) in terms of I, J, K in each block is transformed into B- and C-axis positions (Pbn, Pcn). Then, the rotary axis positions are corrected to attain corrected B- and C-axis positions (Pbn', Pcn'), while the look-ahead is carried out as in the case of the first embodiment.

As a result, the B- and C-axis motion amounts in each block are corrected to be nearly proportional to the corresponding linear axis motion amount. The corrected B- and C-axis positions (Pbn', Pcn') can be inversely transformed into a tool orientation vector command (Pin', Pjn', Pkn') in terms of I, J, K by solving simultaneous equations shown in equation (9), and can be executed as program commands in terms of original X, Y, Z, I, J, K.

It should be noted that this example has been described for the tool rotary head type five-axis machining apparatus shown in FIG. 10. However, there are a table rotary type five-axis machining apparatus in which a table is rotated using two rotary axes, and a mixed type five-axis machining apparatus in which a tool head is rotated using a rotary axis and a table is rotated using another rotary axis. Also in these five-axis machining apparatuses, the tool orientation in terms of commands I, J, K can be transformed into two rotary axis positions, the transformed two rotary axis positions can be corrected, and the corrected two rotary axis positions can be inversely transformed into I, J, K commands. The method for the transformation and inverse transformation is only different in function form from equations (8) and (9). Since the method belongs to known art, a description thereof will be omitted.

Figure 11:
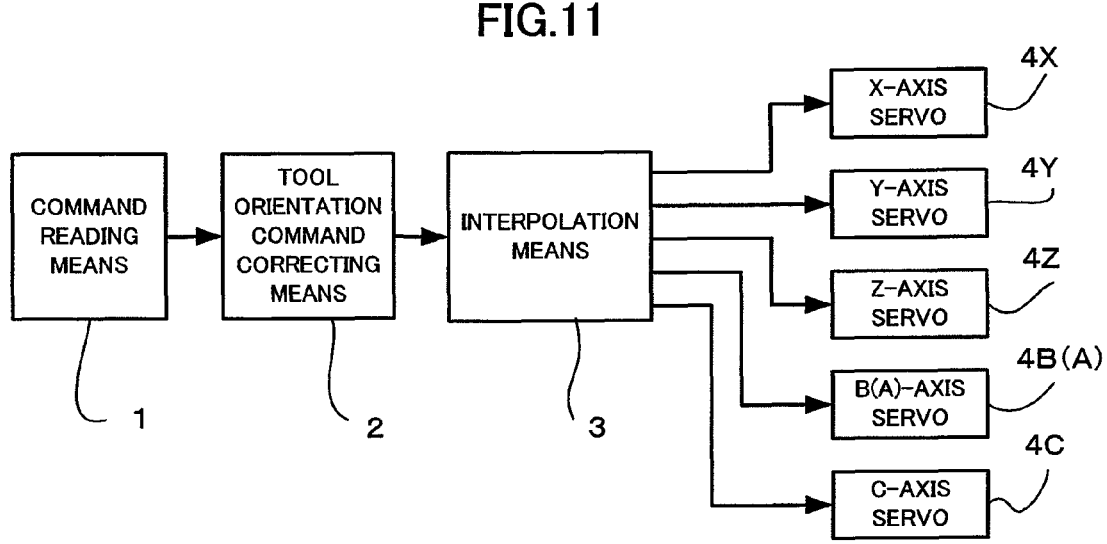
FIG. 11 is a block diagram schematically showing the functions of a numerical controller of the present invention for controlling a five-axis machining apparatus.

FIG. 11 schematically shows in block diagram the functions of a numerical controller of the present invention for controlling a five-axis machining apparatus. Command reading means 1 reads program commands in each block. A tool orientation command in the read program commands is corrected by tool orientation command correcting means 2 such that the ratio between a rotary axis motion amount and a linear axis motion amount becomes constant between blocks. Based on the tool orientation command corrected by the tool orientation command correcting means 2, a motion path command, and a relative motion velocity command, interpolation means 3 carries out interpolation calculation for determining respective axis positions at every interpolation period such that the tool end point moves along a commanded motion path at a commanded velocity. Respective axis servos 4X, 4Y, 4Z, 4B (A), 4C drive respective axis motors (a description of the respective axis motors is omitted) to respective axis positions calculated by the interpolation means 3.

Figure 12:
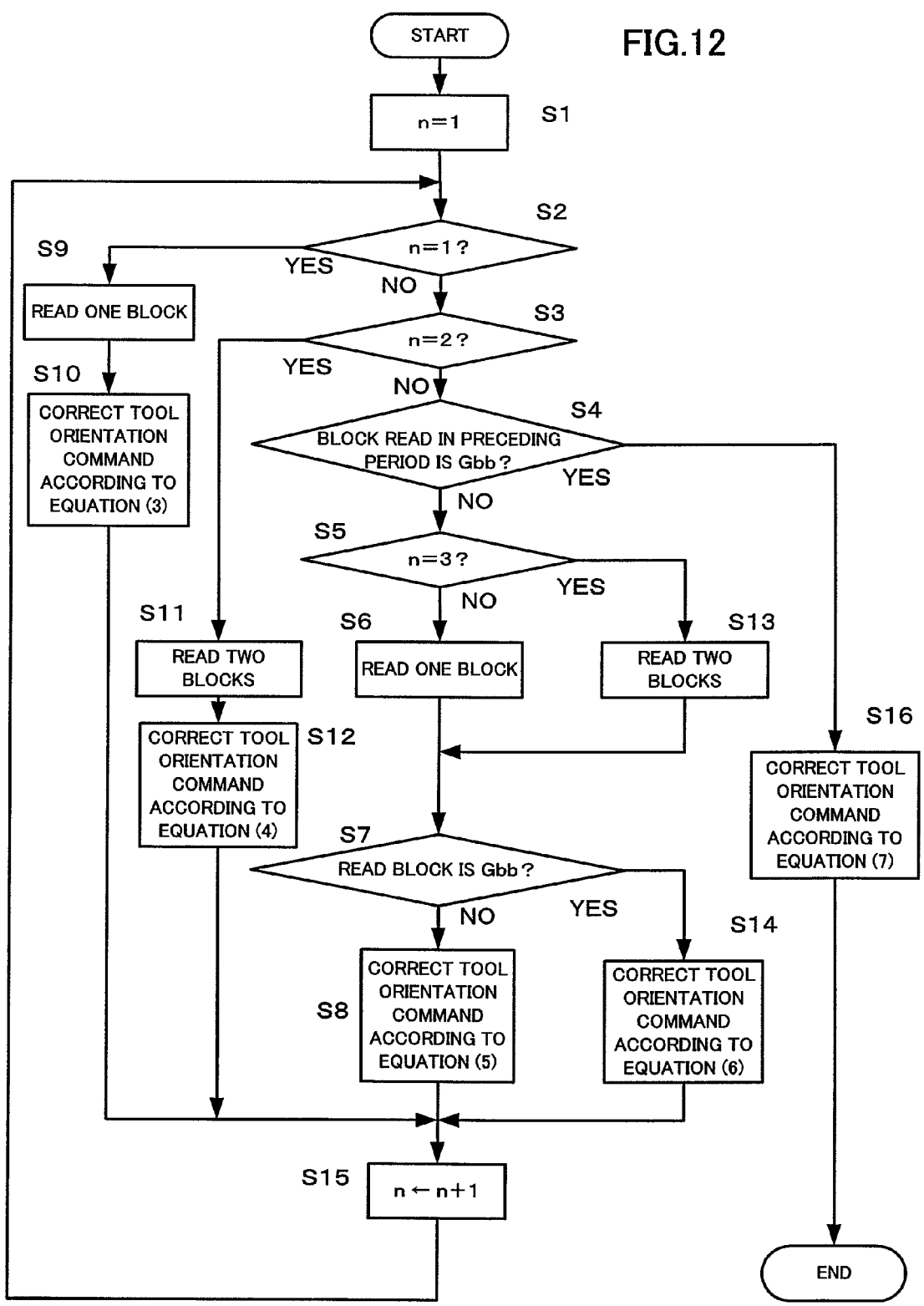
FIG. 12 is an exemplar flowchart showing the algorithm for implementing tool orientation command correction of the present invention.

FIG. 12 shows an exemplar flowchart showing the algorithm for implementing the tool orientation command correction in the first embodiment of the present invention. This flowchart shows processing which is implemented after Gaa in Table 1 is read. It should be noted that at least five blocks are commanded between Gaa and Gbb. In the following, a description will be given in the order of steps.

[Step S1] A parameter n is set to 1. [Step S2] Whether or not n is equal to 1 is determined. If n is equal to 1, the flow proceeds to Step S9. If n is not equal to 1, the flow proceeds to Step S3. [Step S3] Whether or not n is equal to 2 is determined. If n is equal to 2, the flow proceeds to Step S11. If n is not equal to 2, the flow proceeds to Step S4. [Step S4] Whether or not a block read in the preceding processing period is Gbb. If the preceding block is Gbb, the flow proceeds to Step S16. If the preceding block is not Gbb, the flow proceeds to Step S5.

[Step S5] Whether or not n is equal to 3 is determined. If n is equal to 3, the flow proceeds to Step S13. If n is not equal to 3, the flow proceeds to Step S6. [Step S6] One block is read. [Step S7] Whether or not the read block is Gbb is determined. If the read block is Gbb, the flow proceeds to Step S14. If the read block is not Gbb, the flow proceeds to Step S8. [Step S8] A tool orientation command is corrected in accordance with equation (5), and the flow proceeds to Step S15. [Step S9] If it is determined at Step S2 that n is equal to 1, one block is read and the flow proceeds to Step S10.

[Step S10] A tool orientation command is corrected in accordance with equation (3), and the flow proceeds to Step S15. [Step S11] Two blocks are read, and the flow proceeds to Step S12. [Step S12] A tool orientation command is corrected in accordance with equation (4), and the flow proceeds to Step S15. [Step S13] Two blocks are read, and the flow proceeds to Step S7. [Step S14] A tool orientation command is corrected in accordance with equation (6) and the flow proceeds to Step S15. [Step S15] One (1) is added to n and the flow returns to Step S2. [Step S16] A tool orientation command is corrected in accordance with equation (7), and the flow is completed.

FIG. 13 shows in block diagram the essential part of a numerical controller (CNC) 100 for embodying embodiments of the present invention. A CPU 11 is a processor for controlling the entire numerical controller 100. The CPU 11 reads out a system program stored in a ROM 12 via a bus 20, and controls the entire numerical controller in accordance with the system program. A RAM 13 stores temporal calculation data, display data, and various data input by an operator via a display/MDI unit 70.

The CMOS memory 14 is backed up by a battery, not shown, and is configured to be a nonvolatile memory whose storage state is maintained even if the power to the numerical controller 100 is turned off. The CMOS memory 14 stores a machining program read via an interface 15 and machining program, etc. input via the display/MDI unit 70. In the ROM 12, various system programs are written in advance, which are for implementing processing in an edit mode to prepare and edit the machining program and for implementing processing for automatic operation.

A machining program, including commanded point sequence data and vector sequence data and prepared by use of a CAD/CAM apparatus, a copying apparatus, or the like, is input via the interface 15 and stored in the CMOS memory 14. A machining program having a tool orientation command correcting mode according to embodiments of the present invention is also stored in the CMOS memory 14.

A machining program edited in the numerical controller 100 can be delivered via the interface 15 to and stored in an external storage apparatus. In accordance with a sequence program incorporated in the numerical controller 100, a PC (programmable controller) 16 outputs signals via an I/O unit 17 to an auxiliary apparatus (e.g., a tool exchange robot hand or other actuator) of a machine tool and controls the same.

The PC receives signals from switches, etc. of an operation panel installed on the machine tool body, performs required signal processing thereon, and delivers the processed signals to the CPU 11.

The display/MDI unit 70 is a manual data input device provided with a display, keyboard, etc. The interface 18 receives commands and data from the keyboard of the display/MDI unit 70 and delivers the same to the CPU 11. An interface 19 is connected to an operation panel 71 having a manual pulse generator, etc.

Respective axis control circuits 30 to 34 receive respective axis motion command amounts from the CPU 11, and outputs respective axis commands to servo amplifiers 40 to 44. The serve amplifiers 40 to 44 receive the commands and drive respective axis servomotors 50 to 54. The servomotors 50 to 54 incorporate position/velocity detectors, and feed position and velocity feedback signals from the position/velocity detectors back to the axis control circuits 30 to 34 for position/velocity feedback control.

The servomotors 50 to 54 are for driving the X-, Y-, Z-, B(A)-, and C-axes of the five-axis machining apparatus. A spindle control circuit 60 receives a spindle rotation command and outputs a spindle velocity signal to a spindle amplifier 61. The spindle amplifier 61 receives the spindle velocity signal and rotates a spindle motor 62 at a commanded rotational velocity. A position coder 63 feeds a feedback pulse back to the spindle control circuit 60 in synchronism with the rotation of the spindle motor 62 for velocity control.

The above described hardware configuration of the numerical controller 100 is similar to that of the conventional numerical controller. With the numerical controller 100, the drive of the five-axis machining apparatus shown in FIG. 10 is controlled.

What is claimed is:

1. A numerical controller for controlling a five-axis machining apparatus provided with three linear axes and two rotary axes for moving a tool relative to a workpiece mounted on a table, according to a machining program, said numerical controller comprising:

command reading means that successively reads a motion path command for the linear axes, a relative velocity command for designating a velocity of the tool relative to the workpiece, and a tool orientation command designating an orientation of the tool relative to the table, from the machining program;

tool orientation command correcting means that successively corrects the tool orientation command to obtain corrected tool orientation command;

interpolation means that determines respective axes positions at every interpolation period based on the corrected tool orientation command, the motion path command and the relative velocity command such that an end point of the tool moves along the commanded motion path relative to the workpiece at the commanded relative velocity; and means that drives motors for the respective axes to the respective axes positions determined by said interpolation means, wherein said tool orientation command correcting means corrects the tool orientation command in each block such that a ratio between each rotary axis motion amount in a block and linear axis motion amount in the corresponding block is constant, for the motion path command.

2. A numerical controller according to claim 1, wherein the tool orientation commands are commanded in terms of positions of the two rotary axes in the machining program, and said tool orientation command correcting means corrects the positions of the two rotary axes.

3. A numerical controller according to claim 1, wherein the tool orientation commands are commanded in terms of tool orientation vectors, and said tool orientation command correcting means corrects the tool orientation vectors.

4. A numerical controller according to claim 3, wherein said tool orientation command correcting means transforms the tool orientation vectors into positions of the two rotary axes, corrects the positions of the two rotary axes obtained by the transformation, and inversely transforms the corrected positions of the two rotary axes into corrected tool orientation vectors.

5. A numerical controller according to claim 1, wherein when a command to start the tool orientation command correction is read from the machining program, a predetermined number of blocks to be corrected are read in advance by said command reading means until a command to terminate the tool orientation command correction is read, and said tool orientation command correcting means corrects the tool orientation command in the read blocks.

6. A numerical controller according to claim 5, wherein the start of the tool orientation command correction is commanded by a G code, and the termination of the tool orientation command correction is commanded by another G code other than said G code.

* * * * *